United States Patent [19]

Sato et al.

[11] Patent Number: 5,066,438

[45] Date of Patent: Nov. 19, 1991

[54] METHOD OF PRODUCING SILICON NITRIDE SINTERED BODY

[75] Inventors: Michitaka Sato; Hiroaki Nishio, both of Tokyo, Japan

[73] Assignee: NKK Corporation, Tokyo, Japan

[21] Appl. No.: 455,034

[22] Filed: Dec. 22, 1989

[30] Foreign Application Priority Data

Dec. 23, 1988 [JP] Japan .................. 63-323618

[51] Int. Cl.$^5$ .............................. C04B 35/58
[52] U.S. Cl. ............................. 264/56; 264/62; 264/63; 423/344
[58] Field of Search .............. 264/62, 65, 56; 423/344

[56] References Cited

U.S. PATENT DOCUMENTS

| | | | |
|---|---|---|---|
| 3,959,446 | 5/1976 | Mazdiyasni et al. | 423/344 |
| 4,145,224 | 3/1979 | Mehalchick et al. | 423/344 |
| 4,256,688 | 3/1981 | Adlerborn et al. | 264/332 |
| 4,517,168 | 5/1985 | Kawahito et al. | |
| 4,734,234 | 3/1988 | Sterzel | 264/65 |
| 4,921,655 | 5/1990 | Sterzel | 264/66 |

FOREIGN PATENT DOCUMENTS 3504145  8/1986  Fed. Rep. of Germany .

Primary Examiner—James Derrington
Attorney, Agent, or Firm—Sughrue, Mion, Zinn, Macpeak & Seas

[57] ABSTRACT

A method of producing a silicon nitride sintered body which comprises using an amorphous $Si_3N_4$ powder having a mean particle size of 5 to 50 nm, a nitrogen content of 30 to 39 wt. %, an oxygen content of 1 to 10 wt. %, the sum of the nitrogen content and the oxygen content being 38 to 42 wt. % and an unavoidable impurities content of less than 500 ppm as the raw material to form a molded body, sealing the molded body in a capsule and treating it with HIP in the range of 1000° to 1800° C. and 1000 to 2000 atm until the density becomes 3.1 to 3.4 g/cm$^3$. In the method of the invention, active surface energy of silicon nitride powder is utilized as the driving force for sintering due to using a super fine powder. The super fine powder improves sintering ability by uniform mixing. The sintering ability is further improved by substituting a suitable amount of the nitrogen in the silicon nitride with oxygen. By the above means, the sintering strength can be secured under not severe sintering conditions. As a result, a sintering aid can be omitted.

5 Claims, No Drawings

METHOD OF PRODUCING SILICON NITRIDE SINTERED BODY

BACKGROUND OF THE INVENTION

1. Field of the Invention

This invention relates to a method of producing a high strength silicon nitride sintered body.

2. Description of the Prior Art $Si_3N_4$ has high strength and is excellent in heat resistance and corrosion resistance, and therefore, it is expected to be utilized in wide applications such as cutting tools, engine materials for automobiles, materials for aerospace applications and the like.

Incidentally, $Si_3N_4$ is difficult to sinter, because of strong covalent bonding properties, and methods to obtain a high density sintered body thereof are being developed in two courses. In one course, a small amount of an oxide such as $Al_2O_3$, $Y_2O_3$, MgO or $ZrO_2$ is added to $Si_3N_4$ powder as a sintering aid (Yogyo Kyokai-shi, 94, 1, 106, 1986), and in the other course, a molded body without a sintering aid is sintered at a high temperature under a high pressure (Yogyo Kyokai-shi, 95, 2, 229 1987, Zairyo, 31, 349, 967).

According to the former method, the sintering can be conducted even at ordinary pressure. However, it is difficult to blend the sintering aid uniformly, and the sintering aid is liable to deposit at grain boundaries to induce the a decrease of strength. Besides, the sintering aid is softened at a high temperature, and therefore, high temperature strength sharply decreases particularly at higher than 1200° C. In order to solve the above problems, several measures have been proposed such as the selection of the sintering aid (Yogyo Kyokai-shi, 93, 12, 796, 1986) and crystallization of grain boundaries (J. Mater. Sci., 21, 1345-1348, 1986), but these measures are still not sufficient.

In the latter method, the sintering is conducted by hot isostatic pressing (HIP) at 1000° to 2200° C. at 1000 to 2000 atm or by sintering at 1600° to 2000° C. at tens of thousands to hundreds of thousands atm. However, the above methods require very high temperature because of the absence of a sintering aid. Moreover, absolute strength is still low, and therefore, the reliability as materials is insufficient. The sintering under a very high pressure is undesirable from an industrial viewpoint, because it requires a large apparatus and restricting the form and size of sintered bodies.

Thus, a method of producing a high density silicon nitride sintered body at a low temperature without a sintering aid has not been developed yet.

SUMMARY OF THE INVENTION

An object of the invention is to provide a method of producing silicon nitride sintered body having a high density and excellent strength properties by sintering at a low temperature without a sintering aid.

The present inventors investigated in order to achieve the above objective, and found that the object high density sintered body can be obtained without adding a sintering aid by using an amorphous $Si_3N_4$ powder having a mean particle size of 5 to 50 nm, a nitrogen content of 30 to 39 wt. %, an oxygen content of 1 to 10 wt. %, the sum of the nitrogen content and the oxygen content being 38 to 42 wt. % and an unavoidable impurities content of less than 500 ppm as the raw material to form a molded body, sealing the molded body in a capsule and treating it with HIP in the range of 1000° to 1800° C. and 1000 to 2000 atm.

DETAILED DESCRIPTION OF THE INVENTION

The $Si_3N_4$ powder used in the method of the invention is ultra fine, and has a mean particle size of 5 to 50 nm, preferably 10 to 30 nm. When the mean particle size is less than 5 nm, handling and molding are difficult, while, when it is more than 50 nm, the sintering ability is not improved. The nitrogen content of the silicon nitride powder is 30 to 39 wt. %, preferably 35 to 39 wt. %. When the nitrogen content is less than 30 wt. %, the quantity of bonds becomes insufficient because of the shortage of nitrogen atoms diffusing into silicon atoms during sintering. The oxygen content is 1 to 10 wt. %, preferably 1 to 5 wt. %. In the case of ultra fine powder, it is difficult to decrease the oxygen content to less than 1 wt. %, while, when the oxygen content is beyond 10 wt. %, the sintering ability is remarkably inhibited. Furthermore, the sum of the nitrogen content and the oxygen content is 38 to 42 wt. %, preferably 39 to 41 wt. %. When the sum is less than 38 wt. %, the sintering ability is not improved because of the shortage of atoms binding to silicon atoms, while, when the sum is more than 42 wt. %, the inhibition of oxygen atoms against the sintering ability is a problem. Unavoidable impurities should be less than 500 ppm. More than 500 ppm of the impurities inhibits densification and the same are unevenly deposited to reduce the strength of sintered bodies as inclusions or defects. The silicon nitride powder is amorphous. In the case of $Si_3N_4$, phase transition occurs around 1400° C. to the $\alpha$ phase and at higher than about 1500° C. the $\beta$ phase. Therefore, it is supposed that when powder of the $\alpha$ phase or $\beta$ phase which is stable at a high temperature region is used as the starting material, densification does not proceed at lower than the above temperatures.

Such an ultra fine powder is synthesized from $SiCl_4$ and $NH_3$ as the raw materials by the vapor phase method, the plasma method, the laser method or the like. The nitrogen content and the oxygen content can be controlled by oxidizing the prepared powder in the atmosphere or water vapor or by changing the partial pressure of $O_2$ or $H_2O$ in the atmosphere during the synthesis.

Molded bodies of the silicon nitride powder are formed by suspending the powder, granulating and the like and then by molding through uniaxial pressing by CIP. Other methods such as extrusion molding and injection molding are also applicable. Dewaxing treatment may be conducted, if necessary.

The molded body is placed in a glass bottle or capsule such as Vycor glass or quartz glass or in a metal capsule such as gold, platinum, tantalum or soft steel, and sealed in vacuo. When $Si_3N_4$ reacts with the capsule, the molded body may be buried in an unreacting powder such as BN.

The capsule is placed in a HIP furnace, and treated with HIP. The HIP conditions such as temperature and pressure are set according to the kind of capsule and the like.

That is, in the case of glass capsule, the temperature is elevated near the softening point of the glass under ordinary pressure or vacuum, and the glass is sufficiently softened by maintaining the temperature for 0.5 to 1 hour. Then, temperature and pressure are elevated up to the prescribed values. For example, a suitable holding temperature for softening the Vycor glass is about 1300°C., and that of the quarz glass is about 1500° C. Since the ultra fine powder is very active, the particles grow due to the vigorous mass transfer through the surface diffusion in the temperature elevation step under ordinary pressure or vacuum. Therefore, it is preferred that the time to reach the softening point is as short as possible. The applied pressure after softening the glass is 1000 to 2000 atm. When the pressure is less than 1000 atm, the inhibition of grain growth and the increase of the driving force for sintering by the pressure are insufficient, while, when the pressure is beyond 2000 atm, the apparatus becomes of such a large scale it is impractical from the economical viewpoint. The sintering temperature is 1600° to 1800° C. When the temperature is lower than 1600° C., the densification is insufficient or a long time of HIP treatment is necessary, while a temperature beyond 1800° C. is excessive for the densification.

Subsequently, in the case of a metal capsule, it is possible to apply a high pressure from the first, because of having ductility even at ordinary temperature. The pressure is selected from the range of 1000 to 2000 atm because of the beforementioned reasons. A suitable sintering temperature is different according to the material of the capsule, and fundamentally, it is lower than the melting point of the metal. Different from the case of glass capsule, since the grain growth in the temperature elevation process is inhibited by pressuring, the sintering at a low temperature is possible due to keeping the activity of the particles. The melting point of gold is the lowest among the metals enumerated, and it has been found that densification proceeds even at about 1000° C., just lower than the melting point. In the case of platinum and tantalum, HIP treatment is possible up to about 1700° C. and about 3000° C., respectively, in principle, but it is sufficient to be conducted at 1000° to 1600° C. When the temperature is lower than 1000° C., HIP treatment time is too long because the densification rate is very low, while a temperature beyond 1600° C. is excessive for densification. However, when the capsule material is resistant up to 1800° C., densification can be completed in a short time of HIP. The pressure medium may be an inert gas such as Ar, He or $N_2$ or a mixture thereof.

As mentioned above, the HIP conditions are selected from 1000 to 2000 atm, and 1000° to 1800° C. according to the material of the capsule.

Almost 100% densification is possible by the sintering, and the density of the sintered body is in the range of 3.1 to 3.4 g/cm$^3$. The crystal phase of the sintered body is different according to the sintering temperature, and in the case of a temperature lower than about 1500° C., the sintered body is composed of more than 40 wt. % of amorphous phase, 0 to 60 wt. % of α phase and 0 to 10 wt. % of silicon oxynitride. In the case of temperature higher than about 1500° C., it is a complex structure composed of 0 to 40 wt. % of amorphous phase, 10 to 90 wt. % of α phase, 0 to 70 wt. % of β phase and 0 to 10 wt. % of silicon oxynitride. The particles of the sintered body are extremely fine, and the particle size is about 0.1 to 1 μm.

In the method of the present invention, the active surface energy of silicon nitride powder is utilized as the driving force for sintering due to using ultra fine powder. The ultra fine powder improves sintering ability by uniform mixing. The sintering ability is further improved by substituting a suitable amount of the nitrogen in the silicon nitride with oxygen. By the above means, the sintering strength can be secured under not severe sintering conditions. As a result, a sintering aid can be omitted, and the problems caused by a sintering aid such as the decrease of strength by adding a sintering aid, particularly the decrease of the strength at a high temperature, are solved.

EXAMPLES

EXAMPLE 1

50 g of the amorphous $Si_3N_4$ having a mean particle size of 20 nm (10 to 30 nm), an oxygen content of 2.0 wt. %, a nitrogen content of 37.0 wt. % and a total metal impurities content of 300 ppm was dispersed in acetone using supersonic waves, dried to form granules in a rotary evaporator. The granules were placed in a mold having an inside diameter of 30 mmφ, and pressed an uniaxial press at 200 kg/cm$^2$ followed by rubber pressing at 5 t/cm$^2$. The density of the molded body was 1.43 g/cm$^3$. The molded body was placed in a Vycor glass capsule containing boron nitride (BN) powder as the packing powder, and sealed in vacuo at 350° C. at $1\times10^{-5}$ Torr. The capsule was placed in a HIP furnace. The furnace was filled with AR gas as the presuring medium, and the temperature was elevated to 1300° C. at a rate of 10° C./min under ordinary pressure. After keeping this temperature for 1 hour, the temperature and the pressure were simultaneously elevated to 1750° C., 1500 atm, and kept there for 2 hours.

The density of the sintered body thus obtained was 3.30 g/cm$^3$. As a result of X-ray diffraction analysis, the sintered body was composed of 20 wt. % of amorphous phase, 50 wt. % of α phase, 25 wt. % of β phase and 5 wt. % of silicon oxynitride phase. A test piece of the sintered body was buried in resin, and after polishing, the micro Vickers hardness was measured from ordinary temperature to 1300° C. at a load of 200 g. As a result, the micro Vickers hardness was 1800 kg/mm$^2$ at ordinary temperature and 1300 kg/mm$^2$ at 1300° C., and it was confirmed that the sintered body had excellent properties at high temperature. A bending test piece (3×4×40 mm) was cut from the sintered body, and three point bending strength was measured at ordinary temperature and 1350° C. according the JIS method. The strength at ordinary temperature was 92 kg/mm$^2$, and the strength at 1350° C. was 107 kg/mm$^2$.

EXAMPLE 2

Using amorphous $Si_3N_4$ having a mean particle size of 20 nm (10 to 30 nm), a nitrogen content of 32.5 wt. %, an oxygen content of 7.0 wt. % and a total metal impurities content of 200 ppm, a molded body was prepared similar to the method of Example 1.

The molded body was sealed in a gold capsule having an inside diameter of 10 mmφ at ordinary temperature under vacuum at $1\times10^{-4}$ Torr, and placed in a HIP furnace. As the HIP pattern, Ar gas was introduced into the furnace at ordinary temperature, and a pressure of 2000 atm was applied. The temperature was elevated to 1000° C. with keeping the pressure, and kept there for 4 hours.

The density of the sintered body thus obtained was 3.1 g/cm$^3$, and it was composed of amorphous phase alone determined by X-ray analysis.

Comparative Example 1

Using a commercial $Si_3N_4$ powder having a mean particle size of 0.5 μm, a nitrogen content of 38.5 wt. % and an oxygen content of 1.5 wt. %, HIP was conducted by the same method as Example 1.

The density of the sintered body was 2.70 g/cm$^3$. The Vickers hardness was 600 kg/mm$^2$ at ordinary temperature and lowered to 400 kg/mm$^2$ at a high temperature. The three point bending strength was 20 kg/mm$^2$ at ordinary temperature and 22 kg/mm$^2$ at 1350° C.

Comparative Example 2

Using a commercial $Si_3N_4$ powder having a mean particle size of 0.5 μm, a nitrogen content of 38.5 wt. % and an oxygen content of 1.5 wt. %, HIP was conducted by the same method as Example 2. The density of the sintered body was 2.40 g/cm$^3$.

We claim:

1. A method of producing a silicon nitride sintered body which comprises forming a molded body consisting essentially of an amorphous $Si_3N_4$ powder which does not contain a sintering aid, which amorphous $Si_3N_4$ powder has a mean particle size of 5 to 50 nm, a nitrogen content of 30 to 39 wt. %, an oxygen content of 1 to 10 wt. %, the sum of the nitrogen content and the oxygen content being 38 to 42 wt. % and having an unavoidable impurities content of less than 500 ppm as the raw material, sealing the molded body in a capsule and treating it with HIP in the range of 1000° to 1800° C. and 1000 to 2000 atm until the density becomes 3.1 to 3.4 g/cm$_3$.

2. The method of claim 1 wherein the mean particle size is 10 to 30 nm.

3. The method of claim 1 wherein the nitrogen content is 35 to 39 wt. % and the oxygen content is 1 to 5 wt. %.

4. The method of claim 1 wherein the capsule is a glass capsule and the sintering temperature in HIP is 1600° to 1800° C.

5. The method of claim 1 wherein the capsule is a metal capsule and the sintering temperature in HIP is 1000° to 1800° C.

* * * * *